United States Patent Office 3,063,518
Patented Nov. 13, 1962

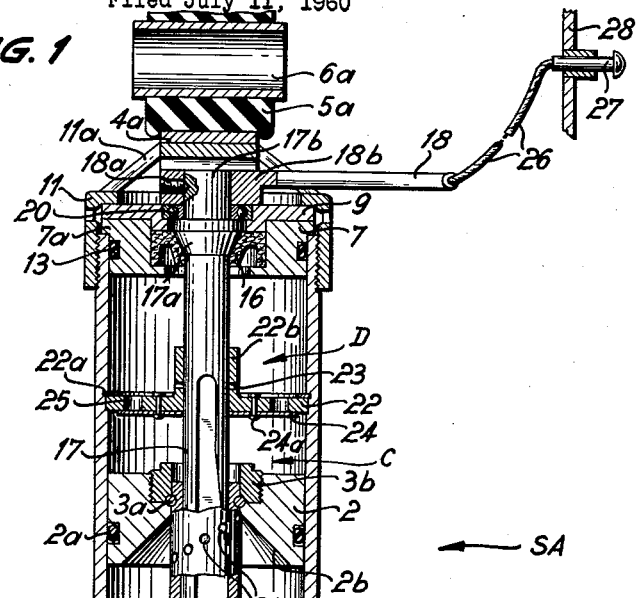

3,063,518
ADJUSTABLE SHOCK ABSORBER FOR AUTOMOTIVE VEHICLES
Helmuth Stark, Berlin, Germany, assignor to Hoesch Aktiengesellschaft, Dortmund, Germany
Filed July 11, 1960, Ser. No. 41,856
5 Claims. (Cl. 188—88)

The present invention relates to shock abosrbers in general, and more particularly to improvements in adjustable double-acting hydraulic shock absorbers for automotive vehicles.

It is already known to adjust a hydraulic shock absorber by changing the tension of springs in valves which control the flow of fluid within the shock absorber. A serious drawback of such shock absorbers is that they can be adjusted only after the conveyance is lifted above the ground or after the shock absorber is actually removed from the conveyance. It is also known to provide a valve cone which is combined with the piston rod and reduces a passage for the flow of fluid when the piston of the shock absorber is reciprocated with respect to its cylinder. Such constructions are rather complicated and require expensive valve mechanisms which are very sensitive.

An important object of the present invention is to provide a shock absorber for automotive vehicles which is of very simple and rugged construction, and which may be readily and accurately adjusted by remote control without requiring its separation from the vehicle or lifting of the vehicle above the ground.

Another object of the invention is to provide a hydraulic shock absorber of the just outlined characteristics which can be adjusted when the automotive vehicle is in motion.

A further object of the invention is to provide a double acting hydraulic shock absorber which can be adjusted by exertion of very small force and which can be readily installed in all types of automotive vehicles.

A concomitant object of the instant invention is to provide a shock absorber of the above outlined characteristics which may be accurately adjusted with the help of a single control element.

Still another object of the invention is to provide a hydraulic shock absorber which can be conveniently adjusted in dependency on the momentary road conditions and the load upon the vehicle.

With the above objects in view, the invention resides in the provision of a double-acting hydraulic shock absorber which comprises essentially a cylinder, a piston which is reciprocably received in the fluid chamber of the cylinder and divides the fluid chamber into two fluid compartments, a hollow piston rod which is connected with the piston and extends from the cylinder, and an adjusting member which extends into the hollow piston rod and is rotatably mounted in an end wall of the cylinder. The piston rod is formed with at least one opening which permits communication of fluid between one of the fluid compartments and the interior of the piston rod, and the adjusting member is formed with at least one elongated peripheral channel which may be aligned with at least one opening in the piston rod to permit the flow of fluid into the other fluid compartment. It is preferred to provide a series of helically arranged openings whose cross-sectional areas may but need not, and preferably are not the same. Also, each channel in the adjusting member preferably comprises a maximum-diameter median portion and tapers gradually in directions toward both end walls of the cylinder. Each channel may further permit communication of fluid between a fluid compartment and a so-called equalizer space which is only partially filled with fluid and which stores fluid expelled from the two compartments when the piston rod penetrates into the cylinder.

The means for rotating the adjusting member and for thereby varying the rate of fluid flow through the opening or openings in the piston rod and through the channel or channels of the adjusting member may consist of a purely mechanical, a magnetic, electric, pneumatic or hydraulic arrangement and, in its preferred form, may be controlled by a pushbutton or a suitable switch which is mounted in the instrument panel of the automotive vehicle so that the driver may adjust the shock absorber with one hand without being compelled to bring the vehicle to a halt and without exerting a substantial force. The adjusting member is preferably mounted in anti-friction bearings which further reduces the force required for its rotation.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawing, in which:

FIG. 1 is an axial section through an adjustable double-acting hydraulic shock absorber embodying my invention; and FIG. 2 is a transverse section taken along the line A—A of FIG. 1, as seen in the direction of arrows.

Referring now in greater detail to the drawing, and first to FIG. 1, there is shown and adjustable double acting hydraulic shock absorber SA which comprises an elongated cylinder 1 defining a cylinder chamber 1a and reciprocably receiving an annular piston 2 which divides the chamber 1a into a lower fluid compartment B and an upper fluid compartment C. The piston 2 is formed with a peripheral groove which receives a sealing gasket 2a to prevent bleeding of hydraulic fluid between the compartments B and C. A hollow piston rod 3 extends coaxially through an annular plug 8 inserted in the lower end of the cylinder 1 and is secured to the piston 2 by a retaining ring 3a which is held in position by an annular screw 3b sunk into the upper end face of the piston 2. The lower end of the piston rod 3 which extends from the cylinder 1 is welded or otherwise secured to an eye 4 which receives a rubber bushing 5 surrounding a stud 6 by means of which the piston rod 3 is connectable to a component of the automotive vehicle, not shown.

The cap screw 11 which holds in position the annular plug 7 inserted in the upper end of the cylinder 1 carries a slotted frame member 11a secured to a second eye 4a which receives a rubber bushing 5a for the stud 6a. This stud is connectable to a second component of the automotive vehicle as is well known in the art.

The lower plug 8 is formed with an external flange 8a which abuts against the lower end face of the cylinder 1 and is pressed thereagainst by an annular sealing plate 10 which, in turn, is held in position by the cap screw 12. The threads of the cap screw 12 mesh with external threads provided at the lower end of the cylinder. The plug 8, the sealing plate 10 and the cap screw 12 together constitute the lower end wall of the cylinder. That end of the hollow piston rod 3 which extends through the lower plug 8 is sealingly surrounded by an annular packing 15 which is inserted into a recess formed between the plug 8 and the sealing plate 10. A rubber gasket 14 is inserted into an annular recess formed in the periphery of the plug 8. The upper plug 7 is also provided with a rubber or like gasket 13 and its external flange 7a is held in position by an annular sealing plate 9 which is held by the cap screw 11. The plug 7, the sealing plate 9 and the cap screw 11 together constitute the upper end wall of the cylinder 1. A sealing packing 16 which is inserted into the recess formed in the upper plug 7 surrounds the conical portion 17a of a rod-shaped adjusting or fluid regulating member 17. The boss 17b of this adjusting member is rotatably received in an antifriction bearing 20 which is mounted in the upper sealing plate 9. This boss is non-rotatably secured by a set screw 18a to the eye-like end portion 18b of a lever 18 by means of which the adjusting member 17 may be rotated with respect to the piston rod 3. The adjusting member 17 is coaxially received in the piston rod 3 and extends toward the lower end wall of the cylinder 1.

The upper fluid compartment C is separated from an equalizer space D by a transverse annular partition 22 which rests on a suitable shoulder formed in the inner surface of the cylinder 1 and is held in such position by a snap ring 22a. The partition 22 is formed with one or more axially parallel bores 25 whose ends communicating with the fluid compartment C are normally sealed by a pressure responsive one-way valve here shown as a spring-flap valve 24 secured to the partition 22 by bolts or rivets 24a. The upper end of each bore 25 communicates with the equalizer space D, and the one-way valve 24 permits the flow of fluid only when the difference in pressures prevailing in the space D and compartment C reaches a given magnitude. The partition 22 is formed with a sleeve-like extension 22b which defines one or more radial ducts 23. The extension 22b slidably guides the adjusting member 17.

As is clearly shown in FIG. 1, the underside of the piston 2 is formed with a conical recess 2b which tapers inwardly and upwardly toward the screw 3b. This recess surrounds a series of helically arranged radial openings 21 provided in the hollow piston rod 3. The cross-sectional areas of openings 21 may be but preferably are not identical; for example, FIG. 1 shows that the diameters and hence the cross-sectional areas of these openings increase progressively so that the maximum-diameter opening is closest to the screw 3b. Of course, and as will be readily understood by perusing the following part of this description, the openings 21 need not be circular and need not necessarily be provided in such close proximity of the piston 2 but may be bounded by polygonal walls and may be located at a greater distance from the piston.

Certain or all of the openings 21 may communicate with at least one but preferably two or even more elongated channels 19 provided in the periphery of the adjusting member 17 (see also FIG. 2). These channels 19 extend well beyond both sides of the piston 2 and their upper portions extend beyond the piston rod 3 so that they establish permanent communication of fluid between the compartment C and the interior of the hollow piston rod 3. In addition, the upper end of each channel 19 extends at least to the level of the radial ducts 23 in the sleeve 22b so that the channels permit continuous communication of fluid between the compartment C and the equalizer space D.

Depending on the angular position of the adjusting member 17 with respect to the piston rod 3, the channels 19 may be brought into at least partial alignment with one or more openings 21 so that they permit the flow of fluid between the compartments B and C. As is clearly shown in FIGS. 1 and 2, the median portion of each channel 19, i.e. that portion which is surrounded by the piston 2 and the apertured portion of the piston rod 3, is preferably of larger cross-sectional area, the channels thereupon tapering at least slightly and gradually in the direction of their respective ends, i.e. toward the upper and lower end walls of the cylinder 1.

The operation of the shock absorber SA is as follows:

It is assumed that the piston 2 is in the position of FIG. 1 and that the compartments B, C are completely filled with a non-compressible fluid, e.g. shock absorber oil. The equalizer space D is only partially filled with fluid. If the shock absorber is then subjected to a force which displaces the piston 2 in upward direction, fluid will flow from the compartment C into the channels 19 and through one or more selected openings 21 into the lower compartment B. A certain quantity of fluid whose volume corresponds to the fluid volume displaced by that portion of the piston rod 3 which penetrates into the fluid compartment B during the upward displacement of the piston 2 will be expelled through the upper ends of channels 19 and through the radial ducts 23 into the equalizer space D. The one-way valve 24 remains in closed position and prevents return flow of fluid into the compartment C. The shock absorbing action is produced by the fluid passing through the opening or openings 21 and duct or ducts 23.

When the piston 2 recoils by moving in downward direction, the direction of fluid flow is reversed, i.e. the fluid then flows from the compartment B, through one or more openings 21 and through the channel or channels 19 into the upper compartment C. At the same time, and because the outwardly advancing piston rod 3 now displaces less fluid in the compartment B, there develops a sub-atmospheric pressure in the compartment C causing the valve 24 to yield to fluid pressure in the equalizer space D so that fluid flows downwardly from the equalizer space and through the bores 25 until the upper compartment C is again completely filled with fluid. The operation is then repeated until the piston returns into a position of equilibrium, i.e. when the amplitude of its vibrations drops to zero.

As is shown in FIG. 1, the lower ends of the channels 19 may be connected by a transverse passage 19a.

The shock absorber of my invention is particularly suitable for use in automotive vehicles. Therefore, it is desirable to provide means which enables a driver to rotate the adjusting member 17 by remote control, i.e. while the conveyance is in motion. This can be attained in a number of ways. For example, and as indicated somewhat schematically in FIG. 1, the lever 18 may be connected with a flexible wire-like member 26, known as Bowden wire, whose other end is connected to a pushbutton 27 mounted in the instrument panel 28 of the vehicle. Thus, the driver can rotate the adjusting member 17 with utmost precision by rocking the lever 18 so as to adapt the shock absorber SA to momentary road or load conditions. Alternately, the purely mechanical rotating means for the adjusting member 17 may be replaced by electric, magnetic, pneumatic or hydraulic rotating means of any suitable design whose exact construction forms no part of my invention.

Each angular position of the adjusting member corresponds to a predetermined rate of fluid flow from the compartment b into the compartment C, or vice versa. Thus, the channel or channels 19 may expose one, two or all openings 21 depending on the condition of the road over which the conveyance travels and/or upon the road which is carried by the conveyance.

Without further analysis, the foregoing will so fully reveal the gist of the present invention that others can, by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

I claim:

1. An adjustable double-acting hydraulic shock absorber comprising, in combination, a cylinder defining a sealed fluid chamber and having a first and a second end wall; an annular partition provided in said cylinder and enclosing with said first end wall a fluid-receiving equalizer space, said partition having a coaxial aperture, duct means communicating with said equalizer space and with said aperture, and at least one substantially axially parallel through-bore; one-way valve means for permitting outflow of fluid from said equalizer space and through said bore; an annular piston reciprocably received in the cylinder between said partition and said second end wall, said piston respectively defining with said partition and with said second end wall a first and a second fluid-filled compartment; a hollow piston rod connected with said piston and extending through said second end wall and from said cylinder, said piston rod formed with at least one opening communicating with said second compartment; an elongated adjusting member rotatably received in said piston rod and extending through said piston into said first compartment and into the aperture of said partition, said adjusting member having at least one elongated peripheral channel in permanent communication with said duct means, said channel at least partially alignable with and sealable from said opening in response to angular displacements of the adjusting member with respect to said piston rod, said channel communicating with said first compartment and permitting communication of fluid between said compartments when at least partially aligned with said opening, said channel and said opening constituting the sole passage means for the flow of fluid between said compartments; and means located externally of said cylinder for rotating the adjusting member with respect to said piston rod, said piston drawing fluid from said equalizer space through said one-way valve means and into said first compartment when moved toward said second end wall, and said channel and said duct means permitting the fluid to flow from said first compartment, through said channel and said duct means and into said equalizer space when the piston is moved toward said partition.

2. A shock absorber as set forth in claim 1, wherein said piston rod has a plurality of openings of different cross-sectional areas.

3. A shock absorber as set forth in claim 1, wherein said piston has a plurality of helically arranged openings.

4. A shock absorber as set forth in claim 1, wherein said adjusting member has a portion rotatably received in the first end wall of said cylinder and said rotating means is connected to said portion of said adjusting member.

5. A shock absorber as set forth in claim 4, further comprising antifriction bearing means mounted in said first end wall and rotatably receiving said portion of said adjusting member.

References Cited in the file of this patent

UNITED STATES PATENTS

| | | |
|---|---|---|
| 1,816,169 | Bommer | July 28, 1931 |
| 1,903,035 | Ewing et al. | Mar. 28, 1933 |
| 2,015,758 | Moulton | Oct. 1, 1935 |
| 2,084,320 | Coleman | June 22, 1937 |
| 2,243,280 | Kyle | May 27, 1941 |
| 2,334,115 | Meredith | Nov. 9, 1943 |
| 2,347,803 | Allen et al. | May 2, 1944 |
| 2,930,070 | Uebelhoer | Mar. 29, 1960 |
| 2,950,785 | Patriquin | Aug. 30, 1960 |

FOREIGN PATENTS

| | | |
|---|---|---|
| 120,363 | France | July 4, 1956 |
| 920,534 | Germany | Nov. 25, 1954 |